US012607453B2

(12) United States Patent
Liu

(10) Patent No.: US 12,607,453 B2
(45) Date of Patent: Apr. 21, 2026

(54) SYSTEM AND METHOD FOR SYNCHRONOUSLY DETECTING THICKNESS AND DOUBLE-SIDE SURFACE PROFILES

(71) Applicant: Hefei Heshi Keda Intelligent Technology Co., Ltd., Hefei (CN)

(72) Inventor: Huajun Liu, Hefei (CN)

(73) Assignee: Hefei Heshi Keda Intelligent Technology Co., Ltd., Hefei (CN)

( * ) Notice: Subject to any disclaimer, the term of this patent is extended or adjusted under 35 U.S.C. 154(b) by 0 days.

(21) Appl. No.: 19/091,907

(22) Filed: Mar. 27, 2025

(65) Prior Publication Data

US 2026/0036418 A1 Feb. 5, 2026

(30) Foreign Application Priority Data

Jul. 31, 2024 (CN) .......................... 202411034673.9

(51) Int. Cl.
*G01B 11/06* (2006.01)
*G01B 11/24* (2006.01)
*G01B 21/08* (2006.01)

(52) U.S. Cl.
CPC .......... *G01B 11/06* (2013.01); *G01B 11/2441* (2013.01); *G01B 21/08* (2013.01); *G01B 11/0608* (2013.01)

(58) Field of Classification Search
CPC .... G01B 11/06; G01B 11/0608; G01B 21/08; G01B 9/02021; G01B 9/02085; G01B 11/2441; G01N 21/55
See application file for complete search history.

(56) References Cited

U.S. PATENT DOCUMENTS 3,536,405 A * 10/1970 Flower ................... G01B 11/06
250/559.27
3,565,531 A * 2/1971 Kane et al. ............ G01B 11/06
250/559.23

(Continued)

FOREIGN PATENT DOCUMENTS

| CN | 103363911 A | 10/2013 |
| CN | 106197295 A | 12/2016 |
| CN | 116576796 A | 8/2023 |

OTHER PUBLICATIONS

A machine translation of CN 111637850 B (Year: 2021).*

*Primary Examiner* — Kara E. Geisel
*Assistant Examiner* — Jonathon Cook
(74) *Attorney, Agent, or Firm* — Bayramoglu Law Offices LLC

(57) ABSTRACT

A system and a method for synchronously detecting thickness and double-side surface profiles that belongs to the technical field of optical measurement. The system includes a light source system, a deflection reflection system, a camera acquisition system, and a processing system. The deflection reflection system includes a decomposition unit and an integration unit. In the system, an optical signal is projected to an upper surface and a lower surface of an object to be measured by the decomposition unit, and then reflected light is converged by the integration unit to form a composite signal, which is captured by a camera to generate an image. The processing system analyzes the image to accurately obtain the thickness and double-side surface profile data of the object.

9 Claims, 2 Drawing Sheets

(56) References Cited

U.S. PATENT DOCUMENTS

| | | | | |
|---|---|---|---|---|
| 3,619,070 A * | 11/1971 | Pirlet | ................... | G01B 11/022 |
| | | | | 348/135 |
| 3,713,739 A * | 1/1973 | Zarezankov | ........... | B82Y 10/00 |
| | | | | 250/559.24 |
| 4,221,486 A | 9/1980 | Guenter | | |
| 6,249,351 B1 | 6/2001 | de Groot | | |
| 7,382,467 B2 * | 6/2008 | Lindner | ............. | G01B 11/2441 |
| | | | | 356/497 |
| 8,913,249 B2 * | 12/2014 | Fleischer | ........... | G01B 9/02028 |
| | | | | 356/497 |
| 9,151,595 B1 * | 10/2015 | Cook | ...................... | G01B 11/06 |
| 11,226,190 B2 * | 1/2022 | Walecki | ............. | G01B 11/2441 |
| 2008/0117429 A1 * | 5/2008 | Strahle | ............... | G01B 9/02021 |
| | | | | 356/521 |
| 2015/0022796 A1 | 1/2015 | Yamaguchi et al. | | |
| 2024/0401930 A1 * | 12/2024 | Orschel | ................. | G01B 11/06 |

* cited by examiner

SYSTEM AND METHOD FOR SYNCHRONOUSLY DETECTING THICKNESS AND DOUBLE-SIDE SURFACE PROFILES

CROSS REFERENCE TO RELATED APPLICATIONS

This application is based upon and claims foreign priority to Chinese Patent Application No. 202411034673.9, filed on Jul. 31, 2024, the entire contents of which are incorporated herein by reference.

TECHNICAL FIELD

The present invention relates to the technical field of optical measurement, in particular to a system and a method for synchronously detecting thickness and double-side surface profiles.

BACKGROUND

In the broad field of optical measurement, thickness detection and surface profile detection are regarded as two key tasks. However, most of measuring instruments on the current market often focus on only one of them, and there are few solutions that can integrate the two functions.

As far as thickness measurement is concerned, most of the existing methods rely on advanced technologies such as laser. However, these methods generally face the problem that the number of coverage points in a single detection is limited, and have extremely high requirements for the alignment accuracy of the positions on both sides of a measurement area, which increases the complexity of operation and the challenge to accuracy. On the other hand, in the field of surface profile detection, in order to realize comprehensive detection of multiple surfaces of an object, it is often necessary to configure multiple sets of independent systems, which not only leads to high investment cost, but also makes the system function relatively single, lack of flexibility and further expansion ability, and difficult to meet the diverse and complex detection needs.

Therefore, it is an urgent problem for those skilled in the art to provide a detection system and method integrating thickness measurement and double-side surface profile detection.

SUMMARY

In view of the above, the present invention provides a system for synchronously detecting thickness and double-side surface profiles, which can realize the measurement of two systems by using one system, and integrate the optical thickness measurement and surface profile detection, thereby reducing the size and cost of equipment.

In order to achieve the above purpose, the present invention adopts the following technical solution.

A system for synchronously detecting thickness and double-side surface profiles, including: a light source system, a deflection reflection system, a camera acquisition system, and a processing system, where the light source system is configured to provide an optical signal;

the deflection reflection system includes a decomposition unit and an integration unit, where the decomposition unit is configured to decompose the optical signal into two beams of sub-optical signals which are respectively projected on an upper surface and a lower surface of an object to be measured, and the integration unit is configured to integrate the sub-optical signals which are respectively reflected on the upper surface and the lower surface of the object to be measured into one beam of composite optical signal and output the composite optical signal to the camera acquisition system;

the camera acquisition system is configured to acquire the composite optical signal outputted by the integration unit and generate image data; and the processing system is configured to analyze the image data to obtain thickness and surface profile data of the object to be measured.

Preferably, the decomposition unit includes: a first plane mirror, a first beam splitting prism, a first reflecting mirror, and a second reflecting mirror, where the optical signal emitted by the light source system is reflected to the first beam splitter prism through the first plane mirror, and the first beam splitter prism decomposes the optical signal into two beams of sub-optical signals, where one beam of sub-optical signal is reflected on the upper surface of the object to be measured through the first reflecting mirror, and the other beam of sub-optical signal is reflected on the lower surface of the object to be measured through the second reflecting mirror.

Preferably, the integration unit includes: a third reflecting mirror, a fourth reflecting mirror, a second beam splitter prism, and a second plane mirror, where the third reflecting mirror receives the sub-optical signal reflected on the upper surface of the object to be measured and reflects the sub-optical signal to the second beam splitter prism, the fourth reflecting mirror receives the sub-optical signal reflected on the lower surface of the object to be measured and reflects the sub-optical signal to the second beam splitter prism, the second beam splitter prism integrates the two beams of received sub-optical signals into one beam of composite optical signal and projects the composite optical signal to the second plane mirror, and the second plane mirror reflects the composite optical signal to the camera acquisition system.

Preferably, the light source system includes a light source generator, a displacement adjustment mechanism, and a fixing mechanism, where the light source generator is configured to generate different light sources;

the displacement adjustment mechanism is configured to adjust a position of the light source generator; and the fixing mechanism is configured to fix the light source generator.

Preferably, the camera acquisition system includes a camera and a lens.

Preferably, the processing system includes a single-side reconstruction unit, a fusion unit, and a thickness detection unit, where the single-side reconstruction unit is configured to construct surface profile data of the upper surface and surface profile data of the lower surface of the object to be measured respectively based on the image data acquired by the camera acquisition system;

the fusion unit is configured to unify and splice the surface profile data of the upper surface and the surface profile data of the lower surface of the object to be measured based on a transformation matrix between the upper surface and the lower surface to obtain complete surface profile data of the object to be measured; and the thickness detection unit is configured to obtain a thickness of the object to be measured according to the complete surface profile data.

Preferably, the processing system further includes a defect detection unit for performing defect detection on the object to be measured according to the surface image data of the object to be measured.

On the other hand, the present invention provides a method for synchronously detecting thickness and double-side surface profiles, which includes the following steps:

emitting an optical signal by a light source system according to a detection need;

reflecting the optical signal to a first beam splitter prism through a first plane mirror, decomposing the optical signal into two beams of sub-optical signals by the first beam splitter prism, where one beam of sub-optical signal is reflected on an upper surface of an object to be measured through a first reflecting mirror, and the other beam of sub-optical signal is reflected on a lower surface of the object to be measured through a second reflecting mirror; receiving the sub-optical signal reflected on the upper surface of the object to be measured and reflecting the sub-optical signal to a second beam splitter prism by a third reflecting mirror, receiving the sub-optical signal reflected on the lower surface of the object to be measured and reflecting the sub-optical signal to the second beam splitter prism by a fourth reflecting mirror, integrating the two beams of received sub-optical signals into one beam of composite optical signal and projecting the composite optical signal to a second plane mirror by the second beam splitter prism, and reflecting the composite optical signal by the second plane mirror;

acquiring the composite optical signal and generating image data; and performing three-dimensional reconstruction on the object to be measured based on the image data, and performing thickness detection and surface profile detection based on a three-dimensional reconstructed object model.

Preferably, the method further includes: obtaining surface image data of the object to be measured, and performing defect detection on the object to be measured based on the surface image data.

It can be known from the above technical solution that compared with the prior art, the present invention discloses and provides a system and a method for synchronously detecting thickness and double-side surface profiles. The measurement tasks of two independent systems can be simultaneously undertaken by adopting one measurement system, which remarkably reduces the operation and purchase cost of equipment. In addition, the system of the present invention realizes the accurate measurement of the thickness and the synchronous detection of the double-side surface profiles, integrates the originally separated optical thickness measurement technology and surface profile detection technology into a whole, and effectively solves the problems of insufficient coverage of detection points and high cost in the traditional method.

BRIEF DESCRIPTION OF DRAWINGS

In order to more clearly illustrate the embodiments of the present invention or the technical solutions in the prior art, the following will briefly introduce the drawings required to be used in the description of the embodiments or the prior art. Obviously, the drawings in the following description are only embodiments of the present invention. For those of ordinary skill in the art, other drawings may also be derived from the provided drawings without any creative effort.

DETAILED DESCRIPTION OF EMBODIMENTS

The technical solutions in the embodiments of the present invention will be clearly and completely described below with reference to the drawings in the embodiments of the present invention. It is obvious that the described embodiments are only a part of the embodiments of the present invention, and not all of the embodiments. Based on the embodiments of the present invention, all other embodiments obtained by those of ordinary skill in the art without any creative work are within the scope of protection of the present invention.

Figure 1:
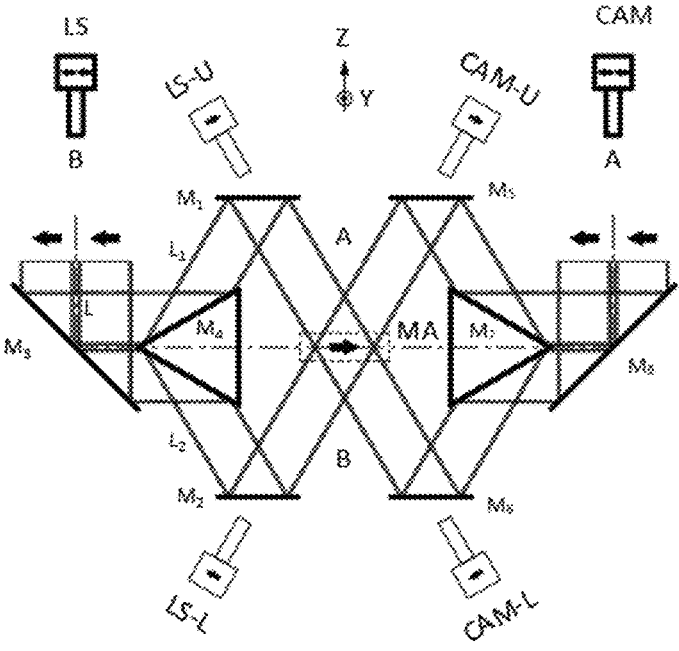
FIG. 1 is a schematic diagram of a structure provided according to the present invention.

The embodiment of the present invention discloses a system for synchronously detecting thickness and double-side surface profiles. As shown in FIG. 1, the system includes: a light source system LS, a deflection reflection system, a camera acquisition system, and a processing system (not shown in the figures), where the light source system is configured to provide an optical signal L;

the deflection reflection system includes a decomposition unit and an integration unit, where the decomposition unit is configured to decompose the optical signal L into two beams of sub-optical signals $L_1$ and $L_2$ which are respectively projected on an upper surface and a lower surface of an object to be measured, and the integration unit is configured to integrate the sub-optical signals which are respectively reflected on the upper surface and the lower surface of the object to be measured into one beam of composite optical signal and output the composite optical signal to the camera acquisition system;

the camera acquisition system is configured to acquire the composite optical signal outputted by the integration unit and generate image data; and the processing system is configured to analyze the image data to obtain thickness and surface profile data of the object to be measured.

Further, the decomposition unit includes: a first plane mirror $M_3$, a first beam splitter prism $M_4$, a first reflecting mirror $M_1$, and a second reflecting mirror $M_2$, where the optical signal L emitted by the light source system LS is reflected to the first beam splitter prism $M_4$ through the first plane mirror $M_3$, and the first beam splitter prism $M_4$ decomposes the optical signal into two beams of sub-optical signals $L_1$ and $L_2$, where one beam of sub-optical signal $L_1$ is reflected on the upper surface MA of the object to be measured through the first reflecting mirror $M_1$, and the other beam of sub-optical signal $L_2$ is reflected on the lower surface MA to be measured through the second reflecting mirror $M_2$.

Figure 2:
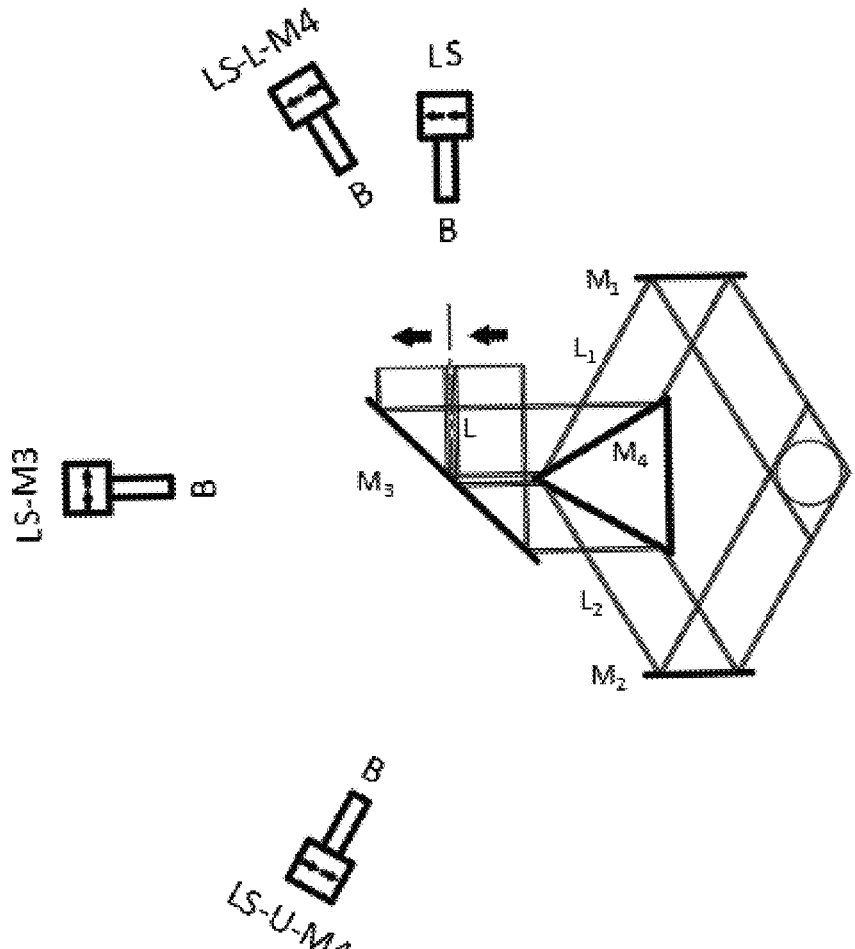
FIG. 2 is a schematic diagram of a position transformation of a light source of the present invention.

In the system, after the optical signal L emitted by the light source system LS is reflected by the plane mirror $M_3$, the incident direction is changed, as shown in FIG. 2, at this time, the light source is equivalent to emitting light at the LS-M3 position, then the light enters the first beam splitter prism $M_4$, and is decomposed by the first beam splitter prism $M_4$ into two parts, and at this time, the light source systems are equivalent to being placed at the positions of LS-M4-U and LS-M4-L in FIG. 2 respectively. Part of the light is projected to the first reflecting mirror $M_1$ after being decomposed by the first beam splitter prism $M_4$, and then is deflected and reflected by the first reflecting mirror $M_1$ to irradiate the upper surface of the object, and the other part of the light is deflected and reflected by $M_2$ to be projected to the lower surface of the object after being split by the prism. Finally, the incident light after splitting and deflection is equivalent to two beams of light emitted by the two light source systems in the LS-U and LS-L directions in FIG. 1, and the two systems are located obliquely above and below the object respectively, and project light to the upper surface and the lower surface of the object respectively.

Further, the integration unit includes: a third reflecting mirror $M_5$, a fourth reflecting mirror $M_6$, a second beam splitter prism $M_7$, and a second plane mirror $M_8$, where the third reflecting mirror $M_5$ receives the sub-optical signal reflected on the upper surface of the object to be measured MA and reflects the sub-optical signal to the second beam splitter prism $M_7$, the fourth reflecting mirror $M_6$ receives the sub-optical signal reflected on the lower surface of the object to be measured MA and reflects the sub-optical signal to the second beam splitter prism $M_7$, the second beam splitter prism $M_7$ integrates the two beams of received sub-optical signals into one beam of composite optical signal and projects the composite optical signal to the second plane mirror $M_8$, and the second plane mirror Ma reflects the composite optical signal to the camera acquisition system.

After being reflected by the object, the lights $L_1$ and $L_2$ projected onto the object enter the third reflecting mirror $M_5$ and the fourth reflecting mirror $M_6$ at the right half part of the deflection reflection system. Two discrete lights are integrated by the second beam splitter prism $M_7$ and then projected onto the second plane mirror $M_8$, and are deflected by the second plane mirror $M_8$ to enter a camera target surface for imaging. At this time, according to the mirror reflection principle, the right part is equivalent to placing the two camera acquisition systems in the position directions of CAM-U and CAM-L in FIG. 1 respectively, and acquiring the images of the upper surface and the lower surface of the measured object respectively.

By utilizing the above method, one light source system and one camera acquisition system are adopted to realize the separate and independent acquisition of two light sources and two camera acquisition systems. In addition, a lens fine-adjustment mechanism may be placed on the prism and the reflecting mirror to adjust the deflection angle of each lens. When the deflection angle is changed, the illumination areas of the light source system on the upper surface and the lower surface of the object to be measured are also changed. Meanwhile, the areas of the upper surface and the lower surface of the object acquired by the camera may also be adjusted by the fine-adjustment mechanism, so that the imaging position areas of the upper surface and the lower surface of the object and the coverage range of the projection light may be respectively changed according to specific use needs, thereby realizing the individual control of the upper system and the lower system or the comprehensive use of the whole system.

In another embodiment, the light source system includes a light source generator, a displacement adjustment mechanism, and a fixing mechanism, where
the light source generator is configured to generate different light sources;

the displacement adjustment mechanism is configured to adjust a position of the light source generator; and
the fixing mechanism is configured to fix the light source generator.

In another embodiment, the camera acquisition system includes a camera and a lens.

In another embodiment, the processing system includes a single-side reconstruction unit, a fusion unit, and a thickness detection unit, where
the single-side reconstruction unit is configured to construct surface profile data of the upper surface and surface profile data of the lower surface of the object to be measured respectively based on the image data acquired by the camera acquisition system;
the fusion unit is configured to unify and splice the surface profile data of the upper surface and the surface profile data of the lower surface of the object to be measured based on a transformation matrix between the upper surface and the lower surface to obtain complete surface profile data of the object to be measured; and
the thickness detection unit is configured to obtain a thickness of the object to be measured according to the complete surface profile data.

For surface profile detection, point cloud data of the upper surface and the lower surface of the object may be obtained according to the result of individual reconstruction. The surface profile change conditions of the upper surface and the lower surface may be fitted according to the point cloud data. Meanwhile, the data of the upper surface and the data of the lower surface of the object to be measured may be unified and spliced by utilizing the transformation matrix between reconstruction systems at the upper part and the lower part. In this way, the synchronous reconstruction and detection of the double-side surface profile of the object may be realized. Specifically, by utilizing the existing public three-dimensional reconstruction method, the calibration and object surface reconstruction of a monocular system composed of the optical signal $L_1$ and the optical signal $L_2$ formed by the light source LS-U and the camera CAM-U may be respectively realized to obtain the point cloud data of the upper surface and the lower surface of the object. By utilizing the existing public method for registration between different spaces, the relative position calibration between the upper and lower monocular systems may be realized. Furthermore, the positional transformation relationship between the two systems in the space is obtained, thereby realizing the unification of the point cloud data between the object surfaces measured by different systems at upper and lower parts.

For the thickness detection, regarding the upper surface and the lower surface of the object that are parallel, the point cloud data of the surface on one side is used for plane fitting, and then the point cloud data of the surface on the other side is used for calculating the average distance from each point to the fitting plane, so that the distance between the upper surface and the lower surface of the object may be obtained, thereby realizing the thickness measurement of the object.

Further, the above processing system further includes a defect detection unit for performing defect detection on the object to be measured according to the surface image data of the object to be measured. The surface image data of the object to be measured may be the surface profile data obtained based on the above surface profile detection, or may be the surface image data of the object to be measured acquired by an independent image acquisition system.

In the solution, a light source part adopts a digital light processing projector. Light projected by the digital light processing projector may be processed through real-time editing. The digital light processing projector may not only project structured light with a specific sign meeting three-dimensional point cloud reconstruction, but also have a common machine vision light source function. Moreover, components on the right side have an image acquisition system function. Meanwhile, the displacement adjustment mechanism may be used for adjusting a shooting area of the object. Therefore, the system fully meets the hardware conditions for traditional defect detection, and may be expanded to realize the traditional defect detection function. In this way, diversified synchronous surface profile detection or defect detection may be also performed on different surfaces of the object to be measured.

Further, by utilizing the two independent light sources and acquisition systems implemented in the solution, different objects may be placed at different positions to perform individual detection on different objects, and different surfaces of the same object may be synchronously detected at the same time, so that the conditions of large size, inconvenience in installation and the like when the two systems are individually arranged are avoided, and the cost is further reduced.

On the other hand, the present invention provides a method for synchronously detecting thickness and double-side surface profiles, which includes the following steps:

emitting an optical signal by a light source system according to a detection need;

reflecting the optical signal to a first beam splitter prism through a first plane mirror, decomposing the optical signal into two beams of sub-optical signals by the first beam splitter prism, where one beam of sub-optical signal is reflected on an upper surface of an object to be measured through a first reflecting mirror, and the other beam of sub-optical signal is reflected on a lower surface of the object to be measured through a second reflecting mirror; receiving the sub-optical signal reflected on the upper surface of the object to be measured and reflecting the sub-optical signal to a second beam splitter prism by a third reflecting mirror, receiving the sub-optical signal reflected on the lower surface of the object to be measured and reflecting the sub-optical signal to the second beam splitter prism by a fourth reflecting mirror, integrating the two beams of received sub-optical signals into one beam of composite optical signal and projecting the composite optical signal to a second plane mirror by the second beam splitter prism, and reflecting the composite optical signal by the second plane mirror;

acquiring the composite optical signal and generating image data; and performing three-dimensional reconstruction on the object to be measured based on the image data, and performing thickness detection and surface profile detection based on a three-dimensional reconstructed object model.

In another embodiment, the method further includes: obtaining surface image data of the object to be measured, and performing defect detection on the object to be measured based on the surface image data.

In this specification, each embodiment is described in a progressive manner, and each embodiment focuses on the differences from other embodiments, and the same and similar parts of each embodiment can be referred to each other. For the device disclosed in the embodiment, since the device corresponds to the method disclosed in the embodiment, the description is relatively simple, and relevant details can be referred to in the method.

The above description of the disclosed embodiments will enable any person skilled in the art to make or use the present invention. Various modifications to these embodiments will be readily apparent to those skilled in the art. The general principles defined herein may be implemented in other embodiments without departing from the spirit or scope of the present invention. Thus, the present invention is not intended to be limited to these embodiments shown herein but is to cover the widest scope consistent with the principles and novel features disclosed herein.

What is claimed is:

1. A system for synchronously detecting thickness and double-side surface profiles, comprising: a light source system, a deflection reflection system, a camera acquisition system, and a processing system, wherein the light source system is configured to provide an optical signal, wherein the light source system comprises a light source generator adopting a digital light processing projector, and the digital light processing projector projects structured light with a specific sign meeting three-dimensional point cloud reconstruction;

the deflection reflection system is configured to split the optical signal into two beams of sub-optical signals which are obliquely projected on an upper surface and a lower surface of an object to be measured at the same time, and simultaneously collect the sub-optical signals which are respectively reflected on the upper surface and the lower surface of the object to be measured into one beam of composite optical signal and output the composite optical signal to the camera acquisition system;

the camera acquisition system is configured to acquire the composite optical signal outputted by the deflection reflection system and generate image data;

the processing system is configured to analyze the image data to obtain thickness and surface profile data of the object to be measured;

the deflection reflection system comprises: a first plane mirror, a second plane mirror, a first beam splitter prism, a second beam splitter prism, a first reflecting mirror, a second reflecting mirror, a third reflecting mirror, and a fourth reflecting mirror, wherein the optical signal emitted by the light source system is reflected to the first beam splitter prism through the first plane mirror, and the first beam splitter prism splits the optical signal into two beams of sub-optical signals, wherein one beam of sub-optical signal is reflected on the upper surface of the object to be measured through the first reflecting mirror, and the other beam of sub-optical signal is reflected on the lower surface of the object to be measured through the second reflecting mirror;

the third reflecting mirror receives the sub-optical signal reflected on the upper surface of the object to be measured and reflects the sub-optical signal to the second beam splitter prism, the fourth reflecting mirror receives the sub-optical signal reflected on the lower surface of the object to be measured and reflects the sub-optical signal to the second beam splitter prism, the second beam splitter prism collects the two beams of received sub-optical signals into one beam of composite optical signal and projects the composite optical signal to the second plane mirror, and the second plane mirror reflects the composite optical signal to the camera acquisition system; and the processing system is configured to:

construct surface profile data of the upper surface and surface profile data of the lower surface of the object to be measured respectively based on the image data acquired by the camera acquisition system;

unify and splice the surface profile data of the upper surface and the surface profile data of the lower surface of the object to be measured based on a transformation matrix between the upper surface and the lower surface to obtain complete surface profile data of the object to be measured; and obtain a thickness of the object to be measured according to the complete surface profile data.

2. The system for synchronously detecting thickness and double-side surface profiles according to claim 1, wherein the light source system further comprises, a displacement adjustment mechanism, wherein the displacement adjustment mechanism is configured to adjust a position of the light source generator.

3. The system for synchronously detecting thickness and double-side surface profiles according to claim 1, wherein the camera acquisition system comprises a camera and a lens.

4. The system for synchronously detecting thickness and double-side surface profiles according to claim 1, wherein the processing system further performs defect detection on the object to be measured according to the surface image data of the object to be measured, wherein the surface image data of the object to be measured is the surface profile data.

5. A method for synchronously detecting thickness and double-side surface profiles, applied to the system for synchronously detecting thickness and double-side surface profiles according to claim 1, comprising the following steps:

emitting an optical signal by a light source system according to a detection need, wherein the light source system comprises a light source generator adopting a digital light processing projector, and the digital light processing projector projects structured light with a specific sign meeting three-dimensional point cloud reconstruction;

reflecting the optical signal to a first beam splitter prism through a first plane mirror, splitting the optical signal into two beams of sub-optical signals by the first beam splitter prism, wherein one beam of sub-optical signal is reflected on an upper surface of an object to be measured through a first reflecting mirror, and the other beam of sub-optical signal is reflected on a lower surface of the object to be measured through a second reflecting mirror; receiving the sub-optical signal reflected on the upper surface of the object to be measured and reflecting the sub-optical signal to a second beam splitter prism by a third reflecting mirror, receiving the sub-optical signal reflected on the lower surface of the object to be measured and reflecting the sub-optical signal to the second beam splitter prism by a fourth reflecting mirror, collecting the two beams of received sub-optical signals into one beam of composite optical signal and projecting the composite optical signal to a second plane mirror by the second beam splitter prism, and reflecting the composite optical signal by the second plane mirror;

acquiring the composite optical signal and generating image data; and performing three-dimensional reconstruction on the object to be measured based on the image data, and performing thickness detection and surface profile detection based on a three-dimensional reconstructed object model.

6. The method for synchronously detecting thickness and double-side surface profiles according to claim 5, further comprising: obtaining surface image data of the object to be measured, and performing defect detection on the object to be measured based on the surface image data, wherein the surface image data of the object to be measured is the surface profile data.

7. The method for synchronously detecting thickness and double-side surface profiles according to claim 5, wherein in the system for synchronously detecting thickness and double-side surface profiles, the light source system further comprises a displacement adjustment mechanism, wherein the displacement adjustment mechanism is configured to adjust a position of the light source generator.

8. The method for synchronously detecting thickness and double-side surface profiles according to claim 5, wherein in the system for synchronously detecting thickness and double-side surface profiles, the camera acquisition system comprises a camera and a lens.

9. The method for synchronously detecting thickness and double-side surface profiles according to claim 5, wherein in the system for synchronously detecting thickness and double-side surface profiles, the processing system further performs defect detection on the object to be measured according to the surface image data of the object to be measured.

\* \* \* \* \*